United States Patent
Zhang et al.

(10) Patent No.: US 9,924,547 B2
(45) Date of Patent: Mar. 20, 2018

(54) CHANNEL ACCESS METHOD AND ACCESS POINT

(71) Applicant: Huawei Technologies Co., Ltd., Shenzhen, Guangdong (CN)

(72) Inventors: Lianbo Zhang, Shenzhen (CN); Yunbo Li, Shenzhen (CN); Jing Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 14/944,618

(22) Filed: Nov. 18, 2015

(65) Prior Publication Data

US 2016/0073434 A1    Mar. 10, 2016

Related U.S. Application Data

(63) Continuation of application No. PCT/CN2013/087308, filed on Nov. 18, 2013.

(30) Foreign Application Priority Data

May 20, 2013   (CN) .......................... 2013 1 0188018

(51) Int. Cl.
*H04W 74/08* (2009.01)
*H04W 74/00* (2009.01)
(Continued)

(52) U.S. Cl.
CPC ..... *H04W 74/0891* (2013.01); *H04W 74/004* (2013.01); *H04W 74/006* (2013.01);
(Continued)

(58) Field of Classification Search
CPC ......... H04W 74/0891; H04W 74/0808; H04W 74/004; H04W 74/006; H04W 74/0866;
(Continued)

(56) References Cited

U.S. PATENT DOCUMENTS 8,917,743 B2 * 12/2014 Zhu ..................... H04W 72/042
370/445
9,301,320 B2 * 3/2016 Nandagopalan ...... H04W 16/28
(Continued)

FOREIGN PATENT DOCUMENTS

| CN | 101288250 A | 10/2008 |
|---|---|---|
| CN | 102076106 A | 5/2011 |

(Continued)

OTHER PUBLICATIONS

"Part 11: Wireless LAN Medium Access Control (MAC) and Physical Layer (PHY) Specifications", IEEE Std 802.11, Mar. 29, 2012, 2793 pages.

*Primary Examiner* — Brian O'Connor

(57) ABSTRACT

Embodiments of the present application provide a channel access method and an access point. The method includes: sending, by a first AP in a first system, a sense time identifier used to identify a sense time reserved on a channel to a first STA in the first system, so as to instruct the first STA to neither send information nor perform random access within the sense time; searching the channel within the sense time for a sequence that is used for random access and that is in a second system, so as to obtain a search result, and determining, according to the search result, whether the channel is obtained by means of competition; The technical solution of the present application provides a new channel access mechanism, which can implement coexistence of a next-generation WiFi system with a traditional WiFi system.

21 Claims, 3 Drawing Sheets

(51) Int. Cl.
*H04W 52/02* (2009.01)
*H04W 72/08* (2009.01)
*H04W 88/10* (2009.01)

(52) U.S. Cl.
CPC .... *H04W 74/0808* (2013.01); *H04W 52/0206* (2013.01); *H04W 52/0209* (2013.01); *H04W 52/0219* (2013.01); *H04W 72/082* (2013.01); *H04W 74/0816* (2013.01); *H04W 74/0833* (2013.01); *H04W 74/0866* (2013.01); *H04W 88/10* (2013.01); *Y02B 60/50* (2013.01)

(58) Field of Classification Search
CPC ......... H04W 52/0209; H04W 52/0219; H04W 72/082; H04W 52/0206; H04W 74/0833; H04W 74/0816; H04W 88/10; H04W 52/02; H04W 72/12; H04W 72/042; Y02B 60/50; H04L 5/0023; H04L 5/0055; H04L 5/0094; H04L 5/0091
See application file for complete search history.

(56) References Cited

U.S. PATENT DOCUMENTS

| | | | |
|---|---|---|---|
| 9,544,847 B2* | 1/2017 | Chu | H04W 52/0206 |
| 9,560,594 B2* | 1/2017 | Cho | H04W 52/0238 |
| 2007/0086416 A1 | 4/2007 | Jang et al. | |
| 2011/0103352 A1 | 5/2011 | Wentink | |
| 2012/0087355 A1 | 4/2012 | Wentink | |
| 2014/0204872 A1 | 7/2014 | Yang et al. | |
| 2014/0204891 A1 | 7/2014 | Park et al. | |
| 2016/0174260 A1* | 6/2016 | Nandagopalan | H04W 16/28 370/338 |
| 2016/0330683 A1* | 11/2016 | Chu | H04W 52/0206 |

FOREIGN PATENT DOCUMENTS

| | | |
|---|---|---|
| CN | 103002544 A | 3/2013 |
| WO | 2013022254 A2 | 2/2013 |

* cited by examiner

CHANNEL ACCESS METHOD AND ACCESS POINT

CROSS-REFERENCE TO RELATED APPLICATIONS

This application is a continuation of International Application No. PCT/CN2013/087308 filed on Nov. 18, 2013, which claims priority to Chinese Patent Application No. 201310188018.4, filed on May 20, 2013, both of which are hereby incorporated by reference in their entireties.

TECHNICAL FIELD

The present application relates to communications technologies, and in particular, to a channel access method and an access point.

BACKGROUND

In a wireless local area network standard, a carrier sense multi-access/collision avoidance (CSMA/CA) technology is used as a channel access method, for example, in a Wireless Fidelity (WiFi) system. Carrier sense is mainly used to determine whether a channel is in an available state. The 802.11 standard includes two carrier sense functions: physical carrier sense and virtual carrier sense.

Compared with a traditional WiFi system, in a next-generation WiFi system, to meet a requirement for a higher rate (dozens of Gb/s), spectrum resources need to be used more efficiently, and technologies such as orthogonal frequency division multiple access (OFDMA) based on a central scheduling mechanism, carrier aggregation, and interference management are used. Although a current channel access mechanism in the wireless local area network standard has taken the physical carrier sense and the virtual carrier sense into consideration, the mechanism cannot adapt to an OFDMA system that has a fixed frame structure and is based on central scheduling. Because in the OFDMA system based on central scheduling, if during downlink sending of a transmission opportunity (TXOP), a channel is obtained by means of competition by a device that supports the traditional WiFi system, subsequent uplink sending may be interfered with by the device that supports the traditional WiFi system and that obtains the channel by means of competition; or if during uplink sending of a TXOP, a channel is obtained by means of competition by a device that supports the traditional WiFi system, subsequent uplink sending and/or downlink sending may be interfered with by the device that supports the traditional WiFi system and that obtains the channel by means of competition. It can be seen that, based on the current channel access mechanism, the next-generation WiFi system is difficult to coexist with the traditional WiFi system. Therefore, a new channel access mechanism is needed to implement coexistence of the next-generation WiFi system with the traditional WiFi system.

SUMMARY

Embodiments of the present application provide a channel access method and an access point, so as to provide a new channel access mechanism to implement coexistence of a next-generation WiFi system with a traditional WiFi system.

A first aspect provides a channel access method, including:

sending, by a first access point AP in a first system, a sense time identifier used to identify a sense time reserved on a channel to a first station STA in the first system, so as to instruct the first STA to neither send information nor perform random access within the sense time, where the sense time is located in an uplink subframe of the last radio frame of a transmission opportunity TXOP of the channel;

searching, by the first AP, the channel within the sense time for a sequence that is used for random access and that is in a second system, so as to obtain a search result, and determining, according to the search result, whether the channel is obtained by means of competition; and if the channel is obtained by means of competition, continuously sending, by the first AP, first downlink information in a downlink subframe of a next TXOP of the sense time, and receiving uplink information sent by the first STA or sending second downlink information in an uplink subframe of the next TXOP.

With reference to the first aspect, in a first possible implementation manner of the first aspect, the searching, by the first AP, the channel within the sense time for a sequence that is used for random access and that is in a second system, so as to obtain a search result, and determining, according to the search result, whether the channel is obtained by means of competition includes:

searching, by the first AP, the channel within the sense time for the sequence that is used for random access and that is in the second system; and if the sequence that is used for random access and that is in the second system is not found on the channel within the sense time, or if the sequence that is used for random access and that is in the second system is found on the channel within the sense time, but energy of the found sequence is less than or equal to a preset energy threshold, determining that the channel is obtained by means of competition.

With reference to the first possible implementation manner of the first aspect, in a second possible implementation manner of the first aspect, the method further includes: if the sequence that is used for random access and that is in the second system is found on the channel within the sense time, and energy of the found sequence is greater than a preset energy threshold, determining that the channel is not obtained by means of competition.

With reference to the first aspect, the first possible implementation manner of the first aspect, or the second possible implementation manner of the first aspect, in a third possible implementation manner of the first aspect, the first downlink information includes a channel occupancy indication, downlink data, and a data pilot signal; and the continuously sending, by the first AP, first downlink information in a downlink subframe of a next TXOP of the sense time includes:

continuously sending, by the first AP, the channel occupancy indication in the first downlink subframe of the next TXOP, where the channel occupancy indication is used to notify a second AP or a second STA in the second system that the first AP occupies the channel before the next TXOP ends; and continuously sending, by the first AP, the downlink data and the data pilot signal in a remaining downlink subframe that is of the next TXOP and in which sending of the downlink data occurs, and continuously sending the data pilot signal in a remaining downlink subframe that is of the next TXOP and in which sending of the downlink data does not occur, where a transmission time interval of the data pilot signal is less than a control point coordination function interframe space PIFS.

With reference to the third possible implementation manner of the first aspect, in a fourth possible implementation manner of the first aspect, the continuously sending, by the first AP, the channel occupancy indication in the first downlink subframe of the next TXOP includes:

continuously sending, by the first AP, a network allocation vector NAV frame in the first downlink subframe of the next TXOP, where the NAV frame includes the channel occupancy indication.

With reference to the first aspect, the first possible implementation manner of the first aspect, or the second possible implementation manner of the first aspect, in a fifth possible implementation manner of the first aspect, the first downlink information includes downlink data and a data pilot signal; and the continuously sending, by the first AP, first downlink information in a downlink subframe of a next TXOP of the sense time includes:

continuously sending, by the first AP, the downlink data and the data pilot signal in each downlink subframe that is of the next TXOP and in which sending of the downlink data occurs, and continuously sending the data pilot signal in each downlink subframe that is of the next TXOP and in which sending of the downlink data does not occur, where a transmission time interval of the data pilot signal is less than a PIFS.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the receiving, by the first AP, uplink information sent by the first STA or sending second downlink information in an uplink subframe of the next TXOP includes:

for each uplink subframe of the next TXOP, if receiving of the uplink information occurs, receiving, in the uplink subframe, the uplink information sent by the first STA, or if receiving of the uplink information does not occur, continuously sending the second downlink information in the uplink subframe.

With reference to the sixth possible implementation manner of the first aspect, in a seventh possible implementation manner of the first aspect, the second downlink information includes a data pilot signal, and a transmission time interval of the data pilot signal is less than the PIFS.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner of the first aspect, the method further includes: sending, by the first AP, a period offset corresponding to the channel to the first STA, so that the first STA determines a start point of the TXOP of the channel according to the period offset.

With reference to the first aspect, the first possible implementation manner of the first aspect, the second possible implementation manner of the first aspect, or the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner of the first aspect, the first AP reserves the sense time on the channel, which includes:

the first AP periodically reserves the sense time on the TXOP of the channel according to a reservation period, where the reservation period is an integer multiple of a length of the TXOP of the channel.

A second aspect provides an access point, located in a first system, where the access point includes:

a sending module, configured to send a sense time identifier used to identify a sense time reserved on a channel to a first station STA in the first system, so as to instruct the first STA to neither send information nor perform random access within the sense time, where the sense time is located in an uplink subframe of the last radio frame of a transmission opportunity TXOP of the channel;

a determining module, configured to search the channel within the sense time for a sequence that is used for random access and that is in a second system, so as to obtain a search result; and determine, according to the search result, whether the channel is obtained by means of competition;

a downlink processing module, configured to: when the determining module determines that the channel is obtained by means of competition, continuously send first downlink information in a downlink subframe of a next TXOP of the sense time; and an uplink processing module, configured to: when the determining module determines that the channel is obtained by means of competition, receive uplink information sent by the first STA or send second downlink information in an uplink subframe of the next TXOP.

With reference to the second aspect, in a first possible implementation manner of the second aspect, the determining module is specifically configured to search the channel within the sense time for the sequence that is used for random access and that is in the second system; and if the sequence that is used for random access and that is in the second system is not found on the channel within the sense time, or if the sequence that is used for random access and that is in the second system is found on the channel within the sense time, but energy of the found sequence is less than or equal to a preset energy threshold, determine that the channel is obtained by means of competition.

With reference to the first possible implementation manner of the second aspect, in a second possible implementation manner of the second aspect, the determining module is further configured to: if the sequence that is used for random access and that is in the second system is found on the channel within the sense time, and energy of the found sequence is greater than a preset energy threshold, determine that the channel is not obtained by means of competition.

With reference to the second aspect, the first possible implementation manner of the second aspect, or the second possible implementation manner of the second aspect, in a third possible implementation manner of the second aspect, the first downlink information includes a channel occupancy indication, downlink data, and a data pilot signal; and the downlink processing module is specifically configured to continuously send the channel occupancy indication in the first downlink subframe of the next TXOP, where the channel occupancy indication is used to notify a second AP or a second STA in the second system that the access point occupies the channel before the next TXOP ends; and continuously send the downlink data and the data pilot signal in a remaining downlink subframe that is of the next TXOP and in which sending of the downlink data occurs, and continuously send the data pilot signal in a remaining downlink subframe that is of the next TXOP and in which sending of the downlink data does not occur, where a transmission time interval of the data pilot signal is less than a control point coordination function interframe space PIFS.

With reference to the third possible implementation manner of the second aspect, in a fourth possible implementation manner of the second aspect, the downlink processing module is specifically configured to continuously send a network allocation vector NAV frame in the first downlink subframe of the next TXOP, where the NAV frame includes the channel occupancy indication; and continuously send the downlink data and the data pilot signal in the remaining downlink subframe that is of the next TXOP and in which sending of the downlink data occurs, and continuously send the data pilot signal in the remaining downlink subframe that is of the next TXOP and in which sending of the downlink data does not occur.

With reference to the second aspect, the first possible implementation manner of the second aspect, or the second possible implementation manner of the second aspect, in a fifth possible implementation manner of the second aspect, the first downlink information includes downlink data and a data pilot signal; and the downlink processing module is specifically configured to continuously send the downlink data and the data pilot signal in each downlink subframe that is of the next TXOP and in which sending of the downlink data occurs, and continuously send the data pilot signal in each downlink subframe that is of the next TXOP and in which sending of the downlink data does not occur, where a transmission time interval of the data pilot signal is less than a PIFS.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner of the second aspect, the uplink processing module is specifically configured to: for each uplink subframe of the next TXOP, if receiving of the uplink information occurs, receive, in the uplink subframe, the uplink information sent by the first STA, or if receiving of the uplink information does not occur, continuously send the second downlink information in the uplink subframe.

With reference to the sixth possible implementation manner of the second aspect, in a seventh possible implementation manner of the second aspect, the second downlink information includes a data pilot signal, and a transmission time interval of the data pilot signal is less than the PIFS.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, or the seventh possible implementation manner of the second aspect, in an eighth possible implementation manner of the second aspect, the sending module is further configured to send a period offset corresponding to the channel to the first STA, so that the first STA determines a start point of the TXOP of the channel according to the period offset.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner of the second aspect, the access point further includes:

a reserving module, configured to reserve the sense time on the channel.

With reference to the ninth possible implementation manner of the second aspect, in a tenth possible implementation manner of the second aspect, the reserving module is specifically configured to periodically reserve the sense time on the TXOP of the channel according to a reservation period, where the reservation period is an integer multiple of a length of the TXOP of the channel.

According to the channel access method and the access point provided in the embodiments of the present application, an access point in a first system reserves a sense time on a channel to perform carrier sense, and sends a sense time identifier used to identify the reserved sense time to a first STA in the first system, so as to instruct the first STA to neither send information nor perform random access within the sense time, thereby performing carrier sense. The access point in the first system searches the channel within the sense time for a sequence that is used for random access and that is in a second system, and determines, according to a search result, whether the channel is obtained by means of competition; and if the channel is obtained by means of competition, continuously sends first downlink information in a downlink subframe of a next TXOP of the sense time, and receives uplink information or sends second downlink information in an uplink subframe of the next TXOP of the sense time, so as to implement access and occupancy of the channel. In the technical solution of the present application, after obtaining the channel by means of competition, the access point in the first system continuously sends and receives information in the uplink subframe and the downlink subframe of the TXOP of the channel, that is, the access point continuously occupies the channel, and the channel is neither occupied by another access point in a same system nor occupied by an access point in a different system. Therefore, a problem that during a TXOP period of a next-generation WiFi system that uses a central scheduling mechanism, a channel is occupied by a device that supports a traditional WiFi system is resolved, and problems such as interference caused by the foregoing problem are resolved, so that the next-generation WiFi system can coexist with the traditional WiFi system.

DETAILED DESCRIPTION

In a wireless local area network standard, a CSMA/CA technology is used as a channel access method. Currently there are two carrier sense functions: physical carrier sense and virtual carrier sense. The physical carrier sense function is provided by a physical layer and depends on a used channel and a modulation scheme. The virtual carrier sense is provided by a network allocation vector (NAV). The NAV is used to specify a predicted time for occupying a channel, where the time is in a unit of microsecond (μs). For ease of distinguishing, a station (STA) in a traditional WiFi system is referred to as a second STA. The second STA sets the NAV to a predicted time for using a channel, where the time includes all frames that must be used to complete overall processing; and another second STA counts a value of the NAV down to 0, and it represents that the channel is in a busy state provided that the value of the NAV is not 0. This is the virtual carrier sense function. When the value of NAV is 0, the virtual carrier sense function displays that the channel is in an idle state. Using the NAV can ensure that a basic operation of an STA is not interrupted. After an operation of the second STA ends, all second STAs can access the channel, and in this case, all the second STAs enter a competition period.

In a next-generation WiFi system, technologies such as OFDMA based on a central scheduling mechanism, carrier aggregation, and interference management are used. For ease of distinguishing, an STA in the next-generation WiFi system is referred to as a first STA. The OFDMA based on the central scheduling mechanism uses a fixed frame structure to schedule the first STA, that is, in one TXOP, the next-generation WiFi system needs to continuously occupy a channel. However, the existing CSMA/CA cannot ensure that in one TXOP, a channel is continuously maintained in the next-generation WiFi system. If during downlink sending of a TXOP, a channel is obtained by means of competition by a device that supports a traditional WiFi system, subsequent uplink sending may be interfered with by the device that supports the traditional WiFi system and that obtains the channel by means of competition; or if during uplink sending of a TXOP, a channel is obtained by means of competition by a device that supports the a traditional WiFi system, subsequent uplink sending and/or downlink sending may be interfered with by the device that supports the traditional WiFi system and that obtains the channel by means of competition. Based on a current channel access mechanism, the next-generation WiFi system is difficult to coexist with the traditional WiFi system. To resolve this problem, an embodiment of the present application provides a new channel access method, where the method is not only applicable to a scenario in which the next-generation WiFi system coexists with the traditional WiFi system, but also applicable to a scenario in which other different systems coexist.

Figure 1:
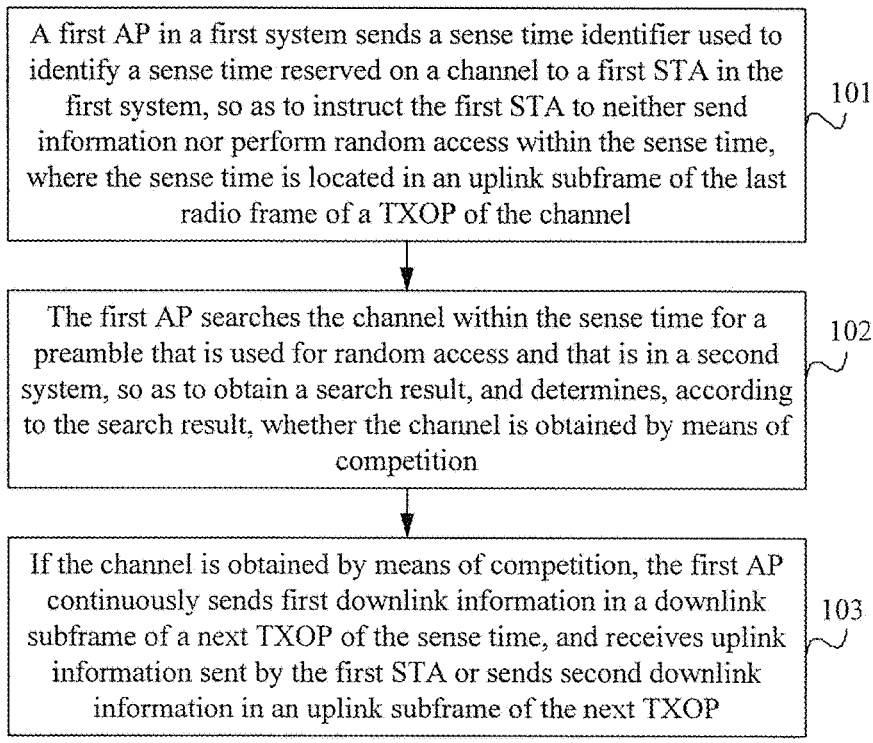
FIG. 1 is a flowchart of a channel access method according to an embodiment of the present application.

FIG. 1 is a flowchart of a channel access method according to an embodiment of the present application. As shown in FIG. 1, the method includes:

101. A first access point (AP) in a first system sends a sense time identifier used to identify a sense time reserved on a channel to a first STA in the first system, so as to instruct the first STA to neither send information nor perform random access within the sense time, where the sense time is located in an uplink subframe of the last radio frame of a TXOP of the channel.

In this embodiment of the present application, the first system is mainly referred to as a communications system that works on an unlicensed frequency band, for example, a 5 GHz frequency band, and that mainly uses technical features such as OFDMA, carrier aggregation (CA), interference management, and a hybrid access manner of central scheduling and competition. Correspondingly, a second system is mainly referred to as a communications system that uses technical features such as channel bonding, a CSMA/CA access manner based on competition or a control point coordination function (PPCF) based on scheduling, and a hybrid coordination control access (HCCA) manner. For example, the first system may be but is not limited to a next-generation WiFi system, and correspondingly, the second system may be but is not limited to a traditional WiFi system. For ease of distinguishing from an AP in the second system, in this embodiment of the present application, an AP in the first system is referred to as a first AP, an STA in the first system is referred to as a first STA, an AP in the second system is referred to as a second AP, and an STA in the second system is referred to as a second STA. In embodiments of the present application, neither a sequence nor a quantity of the "first" and "second" is limited, and the "first" and "second" are merely used to distinguish between APs in two systems.

In this embodiment of the present application, one channel corresponds to one component carrier. A length (or a quantity of included radio frames) of a TXOP of each channel is equal, and radio frames of different channels are synchronized in terms of time, but the TXOP of each channel may be not synchronized in terms of time. One TXOP includes at least one radio frame, and each radio frame is formed by subframes and may include one or more downlink subframes and one or more uplink subframes.

Before step 101, the first AP reserves the sense time on the channel to perform carrier sense, so as to determine whether the first AP obtains the channel by means of competition. Generally, for a time division duplex (TDD) system, a transceiver cannot perform sending and receiving at the same time, and because the power of a transmit signal may be far greater than the power of a receive signal, resulting in that normal receiving cannot be performed, in order that the first AP can normally perform carrier sense, the first AP sends the sense time identifier used to identify the sense time reserved on the channel to the first STA, so as to instruct the first SAT to neither send information nor perform random access within the sense time. For example, the first AP may broadcast the sense time identifier that identifies the reserved sense time to the first STA. After receiving the sense time identifier sent by the first AP, the first STA learns that the first AP will perform carrier sense within the sense time. Therefore, the first STA will not occupy the channel within the sense time, that is, the first STA neither sends information nor initiates random access on the channel. The sense time identifier may be any information that can uniquely identify the sense time reserved on the channel, for example, may be the sense time itself, but is not limited thereto.

In an optional implementation manner, the first AP may periodically reserve the sense time on the TXOP of the channel according to a reservation period, where the reservation period may be an integer multiple of a length of the TXOP of the channel. For example, the reservation period may be as long as the length of the TXOP of the channel, that is, the reservation period may be the same as the length of the TXOP of the channel, and that is, the sense time is reserved in an uplink subframe of the last radio frame of each TXOP. Besides, the reservation period may also be N times the length of the TXOP of the channel, that is, one sense time is reserved on every N TXOPs, where N herein is an integer greater than 1.

Figure 2:
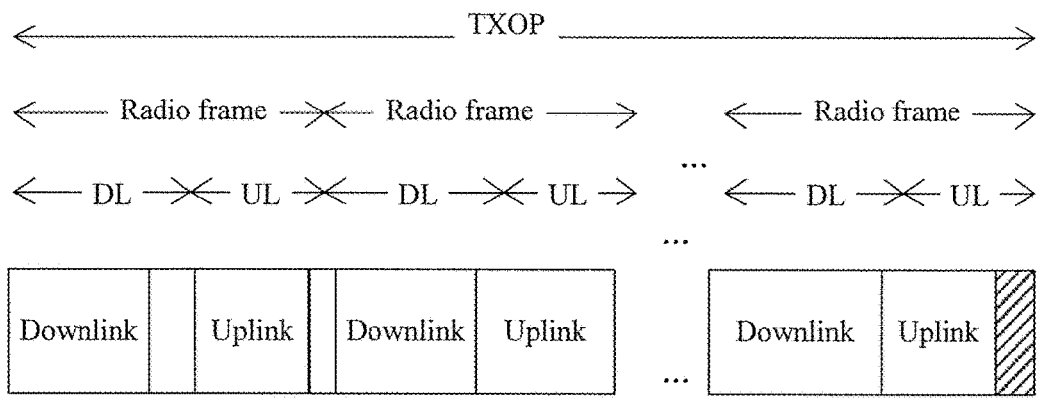
FIG. 2 is a schematic diagram of a location of a sense time reserved on a channel in a radio frame according to an embodiment of the present application.

It should be noted that the reserved sense time may not occupy all parts of the uplink subframe of the last radio frame of the TXOP, that is, the reserved sense time may occupy all parts of the uplink subframe, or may occupy only a length of a latter part of the uplink subframe. As shown in FIG. 2, the reserved sense time occupies only a length of a latter part of the uplink subframe of the last radio frame of the TXOP, that is, a part indicated by inclined lines in FIG. 2. Further, if the sense time does not occupy all parts of the uplink subframe of the last radio frame of the TXOP, the first STA may send uplink information in a non-sense time part of the uplink subframe.

Figure 3:
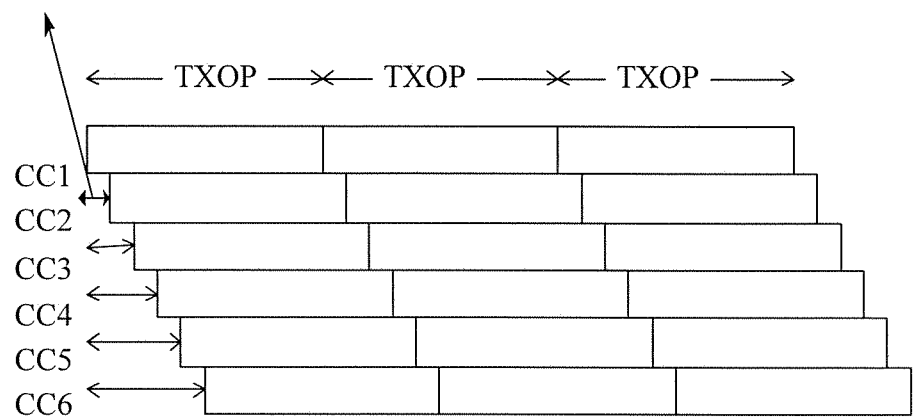
FIG. 3 is a schematic diagram of period offsets corresponding to different channels according to an embodiment of the present application.

In an optional implementation manner, to maintain continuity or quality of service (QoS) of communications, TXOPs of all channels may be staggered by setting different period offsets for all the channels, so that at least one channel of all the channels (that is, component carriers) is in a state in which information can be transmitted. Based on this, in addition to sending the sense time reserved on the channel to the first STA, the first AP may further send a period offset corresponding to the channel to the first STA, so that the first STA determines a start point of the TXOP of the channel according to the period offset. Each channel corresponds to one period offset. Optionally, the period offset may be a modulo of a sequence of a radio frame in which the sense time is located and a quantity of radio frames included in the TXOP of the channel. FIG. 3 is a schematic diagram of period offsets corresponding to different channels according to an embodiment of the present application. "CC" in FIG. 3 represents different channels, where a TXOP of a first channel CC1 is used as a benchmark, a period offset of a second channel CC2 is one radio frame, a period offset of a third channel CC3 is two radio frames, a period offset of a fourth channel CC4 is three radio frames, a period offset of a fifth channel CC5 is four radio frames, a period offset of a sixth channel CC6 is five radio frames, and the like.

102. The first AP searches the channel within the sense time for a sequence that is used for random access and that is in a second system, so as to obtain a search result, and determines, according to the search result, whether the channel is obtained by means of competition.

In an optional implementation manner, the first AP searches the channel within the sense time for the sequence that is used for random access and that is in the second system. If the sequence that is used for random access and that is in the second system is not found on the channel within the sense time, or if the sequence that is used for random access and that is in the second system is found on the channel within the sense time, but energy of the found sequence is less than or equal to a preset energy threshold, it is determined that the channel is obtained by means of competition; or if the sequence that is used for random access and that is in the second system is found on the channel within the sense time, and energy of the found sequence is greater than a preset energy threshold, it is determined that the channel is not obtained by means of competition, that is, the channel is obtained by the second system by means of competition.

The foregoing preset energy threshold may be adaptively set according to an actual application requirement, and a specific value of the preset energy threshold is not limited in this embodiment of the present application.

In another optional implementation manner, the first AP searches the channel within the sense time for the sequence that is used for random access and that is in the second system. If the sequence that is used for random access and that is in the second system is not found on the channel within the sense time, it is determined that the channel is obtained by means of competition; or if the sequence that is used for random access and that is in the second system is found on the channel within the sense time, it is determined that the channel is not obtained by means of competition, that is, the channel is obtained by the second system by means of competition.

It is noted herein that if the first AP cannot obtain the channel by means of competition, the first AP no longer uses the channel in a next TXOP that follows the sense time. If the channel is obtained by means of competition, the following step 103 is performed.

103. If the channel is obtained by means of competition, the first AP continuously sends first downlink information in a downlink subframe of a next TXOP of the sense time, and receives uplink information sent by the first STA or sends second downlink information in an uplink subframe of the next TXOP.

If the first AP obtains the channel by means of competition, it can be learned, according to a feature of the first system, that if a time period during which the first AP does not schedule the first STA exists during a TXOP period, the channel is very likely to be obtained by another AP in a same system or an AP in a different system by means of competition, and in this case, a subsequent uplink or downlink sending and receiving process of the TXOP may be interfered with. Therefore, after determining that the channel is obtained by means of competition, within a next TXOP period, the first AP in this embodiment continuously sends the first downlink information in each first downlink subframe, sends the downlink information or the second downlink information in another downlink subframe, and receives the uplink information sent by the first STA or sends the second downlink information in each uplink subframe, so as to maintain occupancy of the channel, and prevent the channel from being occupied by another AP in a case of no scheduling. Both the first downlink information and the second downlink information described herein are downlink information, where a difference lies in that specific content is different.

In an optional implementation manner, the first downlink information includes downlink data and a data pilot signal. The downlink data herein refers to useful data that needs to be sent to the first STA. Based on this, that the first AP continuously sends first downlink information in a downlink subframe of a next TXOP of the sense time includes: the first AP continuously sends the downlink data and/or the data pilot signal in each downlink subframe of the next TXOP.

Further, that the first AP continuously sends the downlink data and/or the data pilot signal in each downlink subframe of the next TXOP includes: for each downlink subframe of the next TXOP, if sending of the downlink data occurs, the downlink data and the data pilot signal are continuously sent in the downlink subframe; or if sending of the downlink data does not occur, the channel may be occupied by a second AP. To prevent the channel from being occupied by the second AP, the data pilot signal is continuously sent in the downlink subframe, where a transmission time interval of the data pilot signal is less than a PCF interframe space (PIFS).

In another optional implementation manner, the first downlink information may include a channel occupancy indication, downlink data, and a data pilot signal. The downlink data herein refers to useful data that needs to be sent to the first STA. Based on this, in an implementation manner, that the first AP continuously sends first downlink information in a downlink subframe of a next TXOP of the sense time includes: the first AP continuously sends the channel occupancy indication in the first downlink subframe of the next TXOP, where the channel occupancy indication is used to notify a second AP in the second system that the first AP occupies the channel before the next TXOP ends; and continuously sends the downlink data and/or the data pilot signal in a remaining downlink subframe of the next TXOP.

The first AP first continuously sends the channel occupancy indication in the first downlink subframe of the next TXOP, which can make the second AP in the second system learn that the channel has been obtained by the first AP by means of competition. In this case, the second AP can no longer initiate random access before the next TXOP ends, which is beneficial to saving a resource of the second AP. It is noted herein that the channel occupancy indication in this embodiment, on one hand, may be used to notify a second AP or a second STA that the channel is obtained by the first AP by means of competition, and on the other hand, may be used to notify the second AP or the second STA of a time during which the first AP occupies the channel, that is, a length of the TXOP. Further, in an implementation manner, that the first AP continuously sends the channel occupancy indication in the first downlink subframe of the next TXOP includes: the first AP continuously sends an NAV frame in the first downlink subframe of the next TXOP, where the NAV frame includes the channel occupancy indication, and the NAV frame can be identified by a second AP or a second STA.

Further, for some special reasons, a case in which some second APs or second STAs in the second system cannot receive the channel occupancy indication may occur, for example, when a second AP or a second STA just moves to the second system but has not yet received the channel occupancy indication in a timely manner. To prevent the second APs or the second STAs from initiating random channel access, on a basis of sending the channel occupancy indication, the first AP further sends the downlink data and/or the data pilot signal in a subsequent downlink subframe, so as to further prevent the channel from being occupied by the second APs or the second STAs. Further, that the first AP continuously sends the downlink data and/or the data pilot signal in a remaining downlink subframe of the next TXOP includes: for a remaining downlink subframe that is of the next TXOP and in which sending of the downlink data occurs, the downlink data and the data pilot signal are continuously sent in the downlink subframe; and for a remaining downlink subframe that is of the next TXOP and in which sending of the downlink data does not occur, the channel may be occupied by the second AP or the second STA, and to prevent the channel from being occupied by the second AP or the second STA, the data pilot signal is continuously sent in the downlink subframe, where a transmission time interval of the data pilot signal is less than a PIFS.

In an optional implementation manner, that the first AP receives the uplink information sent by the STA or sends the second downlink information in the uplink subframe of the next TXOP includes: for each uplink subframe of the next TXOP, if receiving of the uplink information occurs, the uplink information is received in the uplink subframe; or if receiving of the uplink information does not occur, the channel may be occupied by the second AP or the second STA, and to prevent the channel from being occupied by the second AP or the second STA, the second downlink information is continuously sent in the uplink subframe.

Optionally, the second downlink information may be but is not limited to the data pilot signal, and a transmission time interval of the data pilot signal is less than the PIFS. For example, the second downlink information may further be a signal that is specifically designed to occupy the channel when the channel is idle.

It can be seen from the foregoing that after obtaining a channel by means of competition, a first AP continuously sends and receives information in an uplink subframe and a downlink subframe of a TXOP of the channel, that is, the first AP continuously occupies the channel, and the channel is neither occupied by another AP in a same system nor occupied by an AP in a different system. Therefore, a problem that during a TXOP period of a next-generation WiFi system that uses a central scheduling mechanism, a channel is occupied by a device that supports a traditional WiFi system is resolved, and problems such as interference caused by the foregoing problem are resolved, so that the next-generation WiFi system can coexist with the traditional WiFi system.

Figure 4:
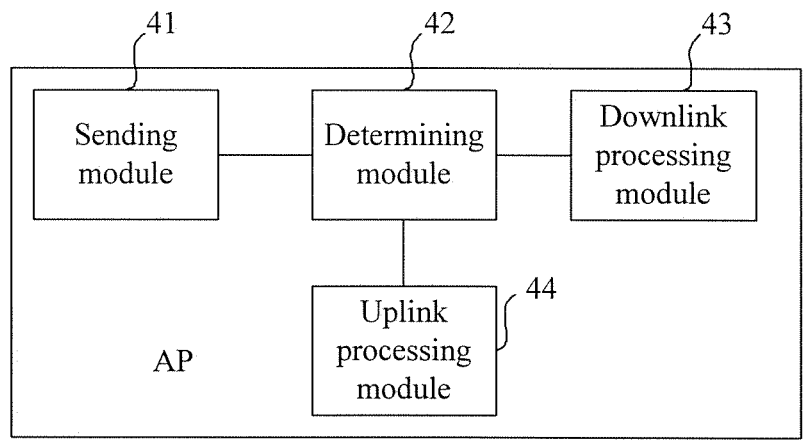
FIG. 4 is a schematic structural diagram of an AP according to an embodiment of the present application.

FIG. 4 is a schematic structural diagram of an AP according to an embodiment of the present application. The AP is located in a first system. As shown in FIG. 4, the AP includes: a sending module 41, a determining module 42, a downlink processing module 43, and an uplink processing module 44.

The sending module 41 is configured to send a sense time identifier used to identify a sense time reserved on a channel to a first STA in the first system, so as to instruct the first STA to neither send information nor perform random access within the sense time, where the sense time is located in an uplink subframe of the last radio frame of a TXOP of the channel.

The determining module 42 is connected to the sending module 41 and configured to: after the sending module 41 sends the sense time to the first STA, search the channel within the sense time for a sequence that is used for random access and that is in a second system, so as to obtain a search result; and determine, according to the search result, whether the channel is obtained by means of competition.

The downlink processing module 43 is connected to the determining module 42 and configured to: when the determining module 42 determines that the channel is obtained by means of competition, continuously send first downlink information in a downlink subframe of a next TXOP of the sense time.

The uplink processing module 44 is connected to the determining module 42 and configured to: when the determining module 42 determines that the channel is obtained by means of competition, receive uplink information sent by the first STA or send second downlink information in an uplink subframe of the next TXOP In an optional implementation manner, the determining module 42 may be specifically configured to search the channel within the sense time for the sequence that is used for random access and that is in the second system; and if the sequence that is used for random access and that is in the second system is not found on the channel within the sense time, or if the sequence that is used for random access and that is in the second system is found on the channel within the sense time, but energy of the found sequence is less than or equal to a preset energy threshold, determine that the channel is obtained by means of competition; or if the sequence that is used for random access and that is in the second system is found on the channel within the sense time, and energy of the found sequence is greater than a preset energy threshold, determine that the channel is not obtained by means of competition.

Alternatively, the determining module 42 may be specifically configured to search the channel within the sense time for the sequence that is used for random access and that is in the second system; and if the sequence that is used for random access and that is in the second system is not found on the channel within the sense time, determine that the channel is obtained by means of competition, or if the sequence that is used for random access and that is in the second system is found on the channel within the sense time, determine that the channel is not obtained by means of competition.

In an optional implementation manner, the first downlink information may include a channel occupancy indication, downlink data, and a data pilot signal. Based on this, the downlink processing module 43 may be specifically configured to continuously send the channel occupancy indication in the first downlink subframe of the next TXOP, where the channel occupancy indication is used to notify a second AP or a second STA in the second system that the AP occupies the channel before the next TXOP ends; and continuously send the downlink data and the data pilot signal in a remaining downlink subframe that is of the next TXOP and in which sending of the downlink data occurs, and continuously send the data pilot signal in a remaining downlink subframe that is of the next TXOP and in which sending of the downlink data does not occur, where a transmission time interval of the data pilot signal is less than a control point coordination function interframe space PIFS.

Further, optionally, that the downlink processing module 43 is configured to continuously send the channel occupancy indication in the first downlink subframe of the next TXOP includes: the downlink processing module 43 may be specifically configured to continuously send an NAV frame in the first downlink subframe of the next TXOP, where the NAV frame includes the channel occupancy indication, and the NAV frame can be identified by the second AP or the second STA. That is, the downlink processing module 43 may be specifically configured to continuously send the NAV frame in the first downlink subframe of the next TXOP; and continuously send the downlink data and the data pilot signal in the remaining downlink subframe that is of the next TXOP and in which sending of the downlink data occurs, and continuously send the data pilot signal in the remaining downlink subframe that is of the next TXOP and in which sending of the downlink data does not occur.

In another optional implementation manner, the first downlink information may include downlink data and a data pilot signal. Based on this, the downlink processing module 43 may be specifically configured to continuously send the downlink data and the data pilot signal in each downlink subframe that is of the next TXOP and in which sending of the downlink data occurs, and continuously send the data pilot signal in each downlink subframe that is of the next TXOP and in which sending of the downlink data does not occur, where a transmission time interval of the data pilot signal is less than a PIFS.

In an optional implementation manner, the uplink processing module 44 may be specifically configured to: for each uplink subframe of the next TXOP, if receiving of the uplink information occurs, receive, in the uplink subframe, the uplink information sent by the first STA, or if receiving of the uplink information does not occur, continuously send the second downlink information in the uplink subframe.

Optionally, the second downlink information includes a data pilot signal, and a transmission time interval of the data pilot signal is less than the PIFS.

In an optional implementation manner, the sending module 41 is further configured to send a period offset corresponding to the channel to the first STA, so that the first STA determines a start point of the TXOP of the channel according to the period offset. It is noted herein that processes in which the sending module 41 sends the sense time and the period offset to the first STA may be two independent processes, or may be a same process.

Optionally, the period offset is a modulo of a sequence of a radio frame in which the sense time is located and a quantity of radio frames included in the TXOP of the channel.

Figure 5:
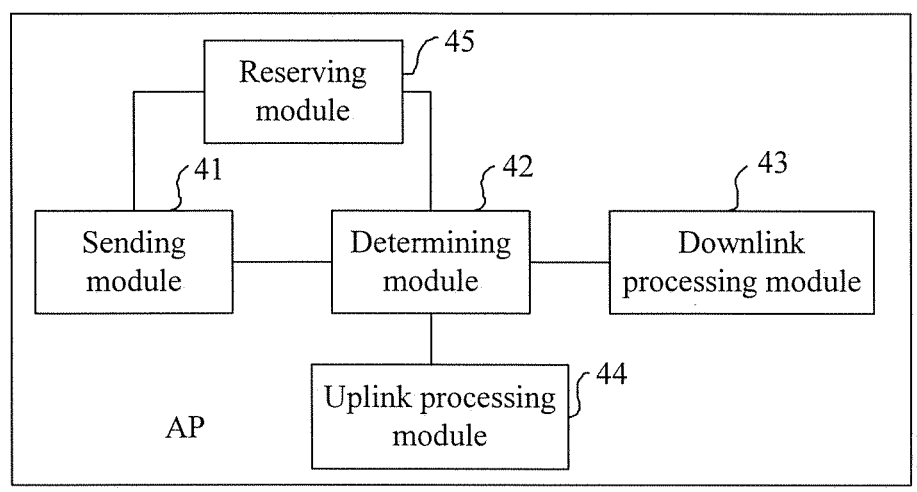
FIG. 5 is a schematic structural diagram of another AP according to an embodiment of the present application.

Further, as shown in FIG. 5, the AP further includes: a reserving module 45. The reserving module 45 is configured to reserve the sense time on the channel. The reserving module 45 is connected to the sending module 41 and the determining module 42, and configured to provide the sending module 41 and the determining module 42 with the sense time reserved on the channel.

Further, optionally, the reserving module 45 may be specifically configured to periodically reserve the sense time on the TXOP of the channel according to a reservation period. Optionally, the reservation period is an integer multiple of a length of the TXOP of the channel. For example, the reservation period may be as long as the length of the TXOP of the channel, that is, the reservation period may be equal to the length of the TXOP of the channel.

The functional modules of the AP provided in this embodiment may be configured to implement the process of the method embodiment shown in FIG. 1. A specific operating principle thereof is not described again. For details, reference may be made to the descriptions about the method embodiment.

The AP provided in this embodiment, which is located in a first system, reserves a sense time on a channel to perform carrier sense, and sends a sense time identifier used to identify the reserved sense time to a first STA, so as to instruct the first STA to neither send information nor perform random access within the sense time, thereby performing carrier sense. In addition, the AP in this embodiment searches the channel within the sense time for a sequence that is used for random access and that is in a second system, and determines, according to a search result, whether the channel is obtained by means of competition; and if the channel is obtained by means of competition, continuously sends first downlink information in a downlink subframe of a next TXOP of the sense time, and receives uplink information or sends second downlink information in an uplink subframe of the next TXOP of the sense time, so as to implement access and occupancy of the channel. After obtaining the channel by means of competition, the AP in this embodiment continuously sends and receives information in the uplink subframe and the downlink subframe of the TXOP of the channel, that is, the AP continuously occupies the channel, and the channel is neither occupied by another AP in a same system nor occupied by an AP in different system. Therefore, a problem that during a TXOP period of a next-generation WiFi system that uses a central scheduling mechanism, a channel is occupied by a device that supports a traditional WiFi system is resolved, and problems such as interference caused by the foregoing problem are resolved, so that the next-generation WiFi system can coexist with the traditional WiFi system.

Figure 6:
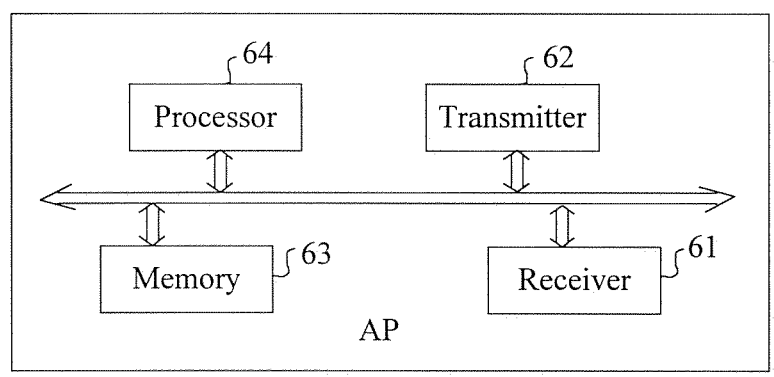
FIG. 6 is a schematic structural diagram of still another AP according to an embodiment of the present application.

FIG. 6 is a schematic structural diagram of an AP according to an embodiment of the present application. The AP is located in a first system. As shown in FIG. 6, the AP includes: a receiver 61, a transmitter 62, a memory 63, and a processor 64.

The transmitter 62 is configured to send a sense time identifier used to identify a sense time reserved on a channel to a first station STA in the first system, so as to instruct the first STA to neither send information nor perform random access within the sense time, where the sense time is located in an uplink subframe of the last radio frame of a transmission opportunity TXOP of the channel.

The memory 63 is configured to store a program. Specifically, the program may include program code, where the program code includes a computer operation instruction.

The processor 64 is configured to execute the program stored in the memory 63, so as to search the channel within the sense time for a sequence that is used for random access and that is in a second system, so as to obtain a search result; and determine, according to the search result, whether the channel is obtained by means of competition.

The transmitter 62 is further configured to: when the processor 64 determines that the channel is obtained by means of competition, continuously send first downlink information in a downlink subframe of a next TXOP of the sense time; or when receiving of uplink information does not occur in an uplink subframe of the next TXOP, send second downlink information in each uplink subframe of the next TXOP.

The receiver 61 is configured to: when the processor 64 determines that the channel is obtained by means of competition, and when receiving of the uplink information occurs in each uplink subframe of the next TXOP, receive, before the next TXOP ends, uplink information sent by the first STA.

In an optional implementation manner, that the processor 64 is configured to search the channel within the sense time for a sequence that is used for random access and that is in a second system, so as to obtain a search result; and determine, according to the search result, whether the channel is obtained by means of competition includes: the processor 64 may be specifically configured to search the channel within the sense time for the sequence that is used for random access and that is in the second system; and if the sequence that is used for random access and that is in the second system is not found on the channel within the sense time, or if the sequence that is used for random access and that is in the second system is found on the channel within the sense time, but energy of the found sequence is less than or equal to a preset energy threshold, determine that the channel is obtained by means of competition; or if the sequence that is used for random access and that is in the second system is found on the channel within the sense time, and energy of the found sequence is greater than a preset energy threshold, determine that the channel is not obtained by means of competition.

Alternatively, the processor 64 may be specifically configured to search the channel within the sense time for the sequence that is used for random access and that is in the second system; and if the sequence that is used for random access and that is in the second system is not found on the channel within the sense time, determine that the channel is obtained by means of competition, or if the sequence that is used for random access and that is in the second system is found on the channel within the sense time, determine that the channel is not obtained by means of competition.

In an optional implementation manner, the first downlink information may include a channel occupancy indication, downlink data, and a data pilot signal. Based on this, the transmitter 62 may be specifically configured to: when the processor 64 determines that the channel is obtained by means of competition, continuously send the channel occupancy indication in the first downlink subframe of the next TXOP, where the channel occupancy indication is used to notify a second AP or a second STA in the second system that the first AP occupies the channel before the next TXOP ends; and continuously send the downlink data and the data pilot signal in a remaining downlink subframe that is of the next TXOP and in which sending of the downlink data occurs, and continuously send the data pilot signal in a remaining downlink subframe that is of the next TXOP and in which sending of the downlink data does not occur, where a transmission time interval of the data pilot signal is less than a PIFS.

Further, optionally, that the transmitter 62 is configured to continuously send the channel occupancy indication in the first downlink subframe of the next TXOP includes: the transmitter 62 may be specifically configured to continuously send an NAV frame in the first downlink subframe of the next TXOP, where the NAV frame includes the channel occupancy indication, and the NAV frame can be identified by the second AP or the second STA. That is, the transmitter 62 may be specifically configured to continuously send the NAV frame in the first downlink subframe of the next TXOP; and continuously send the downlink data and the data pilot signal in the remaining downlink subframe that is of the next TXOP and in which sending of the downlink data occurs, and continuously send the data pilot signal in the remaining downlink subframe that is of the next TXOP and in which sending of the downlink data does not occur, where the transmission time interval of the data pilot signal is less than the PIFS.

In another optional implementation manner, the first downlink information may include downlink data and a data pilot signal. Based on this, the transmitter 62 may be specifically configured to: when the processor 64 determines that the channel is obtained by means of competition, continuously send the downlink data and the data pilot signal in each downlink subframe that is of the next TXOP and in which sending of the downlink data occurs, and continuously send the data pilot signal in each downlink subframe that is of the next TXOP and in which sending of the downlink data does not occur, where a transmission time interval of the data pilot signal is less than a PIFS.

In an optional implementation manner, the receiver 61 may be specifically configured to: when the processor 64 determines that the channel is obtained by means of competition, for each uplink subframe of the next TXOP, if receiving of the uplink information occurs, receive, in the uplink subframe, the uplink information sent by the first STA; or if receiving of the uplink information does not occur, the transmitter 62 continuously sends the second downlink information in the uplink subframe.

Optionally, the second downlink information includes a data pilot signal, and a transmission time interval of the data pilot signal is less than the PIFS.

In an optional implementation manner, the transmitter 62 is further configured to send a period offset corresponding to the channel to the first STA, so that the first STA determines a start point of the TXOP of the channel according to the period offset. It is noted herein that processes in which the transmitter 62 sends the sense time and the period offset to the first STA may be two independent processes, or may be a same process.

Optionally, the period offset is a modulo of a sequence of a radio frame in which the sense time is located and a quantity of radio frames included in the TXOP of the channel.

In an optional implementation manner, the processor 64 is further configured to reserve the sense time on the channel.

Further, optionally, the processor 64 may be specifically configured to periodically reserve the sense time on the TXOP of the channel according to a reservation period. Optionally, the reservation period is an integer multiple of a length of the TXOP of the channel. For example, the reservation period may be as long as the length of the TXOP of the channel, that is, the reservation period may be equal to the length of the TXOP of the channel.

Optionally, in specific implementation, if the receiver 61, the transmitter 62, the memory 63, and the processor 64 are implemented independently of each other, the receiver 61, the transmitter 62, the memory 63, and the processor 64 may be interconnected and complete communication with each other by using a bus. The bus may be an Industry Standard Architecture (ISA) bus, a peripheral component interconnect (PCI) bus, an Extended Industry Standard Architecture (EISA) bus, or the like. The bus may be classified into an address bus, a data bus, a control bus, and the like. For ease of denotation, the bus is indicated by using only one thick line in FIG. 6; however, it does not indicate that there is only one bus or only one type of bus.

Optionally, in specific implementation, if the receiver 61, the transmitter 62, the memory 63, and the processor 64 are integrated into a chip for implementation, the receiver 61, the transmitter 62, the memory 63, and the processor 64 may complete communication with each other by using an internal interface.

Optionally, in addition to including the receiver 61, the transmitter 62, the memory 63, and the processor 64, the AP may further include a power supply, an audio circuit, an input device, and the like.

The AP provided in this embodiment may be configured to implement the process of the method embodiment shown in FIG. 1. A specific operating principle thereof is not described again. For details, reference may be made to the descriptions about the method embodiment.

The AP provided in this embodiment, which is located in a first system, reserves a sense time on a channel to perform carrier sense, and sends a sense time identifier used to identify the reserved sense time to a first STA, so as to instruct the first STA to neither send information nor perform random access within the sense time, thereby performing carrier sense. In addition, the AP in this embodiment searches the channel within the sense time for a sequence that is used for random access and that is in a second system, and determines, according to a search result, whether the channel is obtained by means of competition; and if the channel is obtained by means of competition, continuously sends first downlink information in a downlink subframe of a next TXOP of the sense time, and receives uplink information or sends second downlink information in an uplink subframe of the next TXOP of the sense time, so as to implement access and occupancy of the channel. After obtaining the channel by means of competition, the AP in this embodiment continuously sends and receives information in the uplink subframe and the downlink subframe of the TXOP of the channel, that is, the AP continuously occupies the channel, and the channel is neither occupied by another AP in a same system nor occupied by an AP in different system. Therefore, a problem that during a TXOP period of a next-generation WiFi system that uses a central scheduling mechanism, a channel is occupied by a device that supports a traditional WiFi system is resolved, and problems such as interference caused by the foregoing problem are resolved, so that the next-generation WiFi system can coexist with the traditional WiFi system.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

What is claimed is:

1. A channel access method, comprising:
   sending, by a first access point (AP) in a first system, a sense time identifier used to identify a sense time reserved on a channel to a first station (STA) in the first system, so as to instruct the first STA to neither send information nor perform random access within the sense time, wherein the sense time is located in an uplink subframe of the last radio frame of a transmission opportunity (TXOP) of the channel;
   searching, by the first AP, the channel within the sense time for a sequence that is used for random access and that is in a second system, so as to obtain a search result, and determining, according to the search result, whether the channel is obtained by competition; and
   if the channel is obtained by competition, continuously sending, by the first AP, first downlink information in a downlink subframe of a next TXOP of the sense time, and receiving uplink information sent by the first STA or sending second downlink information in an uplink subframe of the next TXOP.

2. The method according to claim 1, wherein searching, by the first AP, the channel within the sense time for a sequence that is used for random access and that is in a second system, so as to obtain a search result, and determining, according to the search result, whether the channel is obtained by competition comprises:
   searching, by the first AP, the channel within the sense time for the sequence that is used for random access and that is in the second system; and
   if the sequence that is used for random access and that is in the second system is not found on the channel within the sense time, or if the sequence that is used for random access and that is in the second system is found on the channel within the sense time, but energy of the found sequence is less than or equal to a preset energy threshold, determining that the channel is obtained by competition.

3. The method according to claim 2, further comprising:
   if the preamble that is used for random access and that is in the second system is found on the channel within the sense time, and energy of the found sequence is greater than a preset energy threshold, determining that the channel is not obtained by competition.

4. The method according to claim 3, wherein:
   the first downlink information comprises a channel occupancy indication, downlink data, and a data pilot signal; and
   continuously sending, by the first AP, first downlink information in a downlink subframe of a next TXOP of the sense time comprises:

continuously sending, by the first AP, the channel occupancy indication in the first downlink subframe of the next TXOP, wherein the channel occupancy indication is used to notify a second AP or a second STA in the second system that the first AP occupies the channel before the next TXOP ends, and continuously sending, by the first AP, the downlink data and the data pilot signal in a remaining downlink subframe that is of the next TXOP and in which sending of the downlink data occurs, and continuously sending the data pilot signal in a remaining downlink subframe that is of the next TXOP and in which sending of the downlink data does not occur, wherein a transmission time interval of the data pilot signal is less than a point coordination function interframe space (PIFS).

5. The method according to claim 4, wherein continuously sending, by the first AP, the channel occupancy indication in the first downlink subframe of the next TXOP comprises:
continuously sending, by the first AP, a network allocation vector (NAV) frame in the first downlink subframe of the next TXOP, wherein the NAV frame comprises the channel occupancy indication.

6. The method according to claim 3, wherein:
the first downlink information comprises downlink data and a data pilot signal; and
continuously sending, by the first AP, first downlink information in a downlink subframe of a next TXOP of the sense time comprises:
continuously sending, by the first AP, the downlink data and the data pilot signal in each downlink subframe that is of the next TXOP and in which sending of the downlink data occurs, and continuously sending the data pilot signal in each downlink subframe that is of the next TXOP and in which sending of the downlink data does not occur, wherein a transmission time interval of the data pilot signal is less than a point coordination function interframe space (PIFS).

7. The method according to claim 1, wherein receiving uplink information sent by the first STA or sending second downlink information in an uplink subframe of the next TXOP comprises:
for each uplink subframe of the next TXOP, if receiving of the uplink information occurs, receiving, in the uplink subframe, the uplink information sent by the first STA, or if receiving of the uplink information does not occur, continuously sending the second downlink information in the uplink subframe.

8. The method according to claim 7, wherein the second downlink information comprises a data pilot signal having a transmission time interval less than the PIFS.

9. The method according to claim 1, further comprising:
sending, by the first AP, a period offset corresponding to the channel to the first STA, so that the first STA determines a start point of the TXOP of the channel according to the period offset.

10. The method according to claim 1, further comprising:
periodically reserving, by the first AP, the sense time on the TXOP of the channel according to a reservation period, wherein the reservation period is an integer multiple of a length of the TXOP of the channel.

11. An access point (AP) for use in a first system, the access point comprising:
a sending module, configured to send a sense time identifier used to identify a sense time reserved on a channel to a first station (STA) in the first system, so as to instruct the first STA to neither send information nor perform random access within the sense time, wherein the sense time is located in an uplink subframe of the last radio frame of a transmission opportunity (TXOP) of the channel;
a determining module, configured to search the channel within the sense time for a sequence that is used for random access and that is in a second system, so as to obtain a search result, and determine, according to the search result, whether the channel is obtained by competition;
a downlink processing module, configured to: when the determining module determines that the channel is obtained by competition, continuously send first downlink information in a downlink subframe of a next TXOP of the sense time; and
an uplink processing module, configured to: when the determining module determines that the channel is obtained by competition, receive uplink information sent by the first STA or send second downlink information in an uplink subframe of the next TXOP.

12. The access point according to claim 11, wherein the determining module is configured to:
search the channel within the sense time for the sequence that is used for random access and that is in the second system; and
if the sequence that is used for random access and that is in the second system is not found on the channel within the sense time, or if the sequence that is used for random access and that is in the second system is found on the channel within the sense time, but energy of the found sequence is less than or equal to a preset energy threshold, determine that the channel is obtained by competition.

13. The access point according to claim 12, wherein the determining module is further configured to:
if the sequence that is used for random access and that is in the second system is found on the channel within the sense time, and energy of the found sequence is greater than a preset energy threshold, determine that the channel is not obtained by competition.

14. The access point according to claim 13, wherein:
the first downlink information comprises a channel occupancy indication, downlink data, and a data pilot signal; and
the downlink processing module is configured to:
continuously send the channel occupancy indication in the first downlink subframe of the next TXOP, wherein the channel occupancy indication is used to notify a second AP or a second STA in the second system that the access point occupies the channel before the next TXOP ends, and
continuously send the downlink data and the data pilot signal in a remaining downlink subframe that is of the next TXOP and in which sending of the downlink data occurs, and continuously send the data pilot signal in a remaining downlink subframe that is of the next TXOP and in which sending of the downlink data does not occur, wherein a transmission time interval of the data pilot signal is less than a control point coordination function interframe space (PIFS).

15. The access point according to claim 14, wherein the downlink processing module is configured to:
continuously send a network allocation vector NAV frame in the first downlink subframe of the next TXOP, wherein the NAV frame comprises the channel occupancy indication; and continuously send the downlink data and the data pilot signal in the remaining downlink subframe that is of the next TXOP and in which sending of the downlink data occurs, and continuously send the data pilot signal in the remaining downlink subframe that is of the next TXOP and in which sending of the downlink data does not occur.

16. The access point according to claim 13, wherein:
the first downlink information comprises downlink data and a data pilot signal; and
the downlink processing module is configured to:
  continuously send the downlink data and the data pilot signal in each downlink subframe that is of the next TXOP and in which sending of the downlink data occurs, and
  continuously send the data pilot signal in each downlink subframe that is of the next TXOP and in which sending of the downlink data does not occur, wherein a transmission time interval of the data pilot signal is less than a control point coordination function interframe space (PIFS).

17. The access point according to claim 11, wherein the uplink processing module is configured to:
for each uplink subframe of the next TXOP, if receiving of the uplink information occurs, receive, in the uplink subframe, the uplink information sent by the first STA, or if receiving of the uplink information does not occur, continuously send the second downlink information in the uplink subframe.

18. The access point according to claim 17, wherein the second downlink information comprises a data pilot signal having a transmission time interval less than the PIFS.

19. The access point according to claim 11, wherein the sending module is further configured to:
send a period offset corresponding to the channel to the first STA, so that the first STA determines a start point of the TXOP of the channel according to the period offset.

20. The access point according to claim 11, further comprising:
a reserving module, configured to reserve the sense time on the channel.

21. The access point according to claim 20, wherein the reserving module is configured to:
periodically reserve the sense time on the TXOP of the channel according to a reservation period, wherein the reservation period is an integer multiple of a length of the TXOP of the channel.

* * * * *